(12) United States Patent
Wermeister et al.

(10) Patent No.: US 7,101,121 B2
(45) Date of Patent: Sep. 5, 2006

(54) MILLING CUTTER WITH PRECISION ADJUSTMENT (75) Inventors: Günter Wermeister, Meerbusch (DE); Stefan Knecht, Dortmund (DE); Rudolf Lohr, Neuss (DE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/422,995

(22) Filed: Apr. 25, 2003

(65) Prior Publication Data
US 2003/0215294 A1    Nov. 20, 2003

(30) Foreign Application Priority Data
Apr. 25, 2003 (DE) ................. 102 18 630

(51) Int. Cl.
*B23C 3/06* (2006.01)
(52) U.S. Cl. .......................... 407/113; 407/61
(58) Field of Classification Search ............... 411/413, 411/415; 82/106; 409/199; 407/12, 44–6, 407/34, 51–2, 56, 58, 61–3, 113
See application file for complete search history.

(56) References Cited

U.S. PATENT DOCUMENTS

| | | | | |
|---|---|---|---|---|
| 2,485,280 A | * | 10/1949 | Grace | 254/98 |
| 2,955,349 A | * | 10/1960 | York | 407/5 |
| 3,195,376 A | * | 7/1965 | Bader | 408/146 |
| 3,708,843 A | * | 1/1973 | Erkfritz | 407/38 |
| 3,792,517 A | | 2/1974 | Gage | |
| 4,050,129 A | * | 9/1977 | Jester et al. | 407/45 |
| 4,648,760 A | * | 3/1987 | Karlsson et al. | 408/223 |
| 4,867,616 A | | 9/1989 | Jakubowicz | |
| 5,037,248 A | * | 8/1991 | Heffron | 407/12 |
| 5,454,671 A | * | 10/1995 | Qvarth | 407/42 |
| 5,667,343 A | * | 9/1997 | Hessman et al. | 407/36 |
| 6,056,484 A | * | 5/2000 | Mitchell et al. | 407/36 |
| 6,280,122 B1 | * | 8/2001 | Qvarth | 407/36 |
| 6,334,740 B1 | * | 1/2002 | Qvarth | 407/36 |
| 2003/0113175 A1 | * | 6/2003 | Wermeister | 407/113 |
| 2003/0165363 A1 | * | 9/2003 | Wermeister | 407/115 |

FOREIGN PATENT DOCUMENTS

| | | |
|---|---|---|
| DE | 201 03 921 U-1 | 7/2001 |
| DE | 100 17 645 | 10/2001 |
| EP | 0 873 808 | 10/1998 |
| FR | 2 431 897 | 2/1980 |
| FR | 2 615 769 | 12/1988 |
| WO | WO 01/76796 | 10/2001 |

* cited by examiner

*Primary Examiner*—Boyer D. Ashley
*Assistant Examiner*—Sara Addisu
(74) *Attorney, Agent, or Firm*—Drinker Biddle & Reath LLP (57) ABSTRACT A cutter insert for disc-milling cutters, in particular, for milling crankshafts. The insert has upper and lower surfaces and circumferential lateral surfaces, which connect the upper and lower surfaces to one another. The insert includes raised swellings and/or projections on the upper surface, at least in the region of two corners, which preferably extend over the entire length of one side of the cutter insert, so that, in a view perpendicularly toward a cutting face formed by at least one of the lateral surfaces, the edge which defines the transition from the upper surface to the cutting face, has a portion projecting relative to the central edge section in the region of each of the two ends of this edge.

34 Claims, 13 Drawing Sheets

(PRIOR ART)

MILLING CUTTER WITH PRECISION ADJUSTMENT

BACKGROUND OF THE INVENTION

This application claims priority under 35 U.S.C. §§ 119 and/or 365 to Patent Application Ser. No. 102 18 630.8 filed in Germany on Apr. 25, 2002 the entire content of which is hereby incorporated by reference.

The present invention relates to a disc-milling cutter, especially for milling crankshafts, and a cutter insert for use therein. A disc-milling cutter comprises a milling disc on which cutter inserts are mounted.

Milling is a material-removing process wherein the tool rotates, and relative movements between the workpiece and the tool take place perpendicular to the rotational axis of the tool. The tool is fitted with cutters, which produce the cutting motion during the rotation of the tool about the central tool axis. Feeding movements can be made in various directions. Such feeding movements may be performed either by the tool or by the workpiece or even by both. By way of distinction from turning or drilling, the cutters are not constantly engaged with the workpiece. On the contrary, after one cut on the workpiece, the cutters are returned to the starting position. This provides the advantage that the cutters can cool down and material chips can be removed from the chip spaces.

In the context of milling, cutter inserts, which provide the appropriate cutting edges, are generally attached to the tools used. Cutter inserts of this kind, which are also referred to as tool tips, have been known in principle for a considerable time.

By "crankshafts" is generally meant machine elements which convert linear movements into rotating movements or vice versa. Forging or casting methods are generally used in the mass production of crankshafts. Modern engine design places increasing demands on the performance and smooth running of crankshafts. Costs must also be kept to a minimum. Essential requirements include a higher engine performance for a given piston stroke, an improved level of efficiency, that is, reduced loss due to friction, and a reduction in weight. This means that all design parameters, such as dimensions, material properties and surface treatment, in particular low surface tolerances, must be optimized. At the same time, in order to reduce production costs during the manufacturing of crankshafts, grinding has frequently been replaced by material removal with a defined cutting edge, for example, turning, turn broaching or milling, wherever possible.

In particular for the machining of crank bearings on crankshafts, external milling using the pendulum process has recently proved successful. In this context, a distinction is made between rough-milling and finishing milling; milling cutters with a diameter of 700 mm and up to 270 indexable inserts have been widely used.

In the context of finishing milling, the milling cutters are generally fitted with diameter cutters and recess cutters. The diameter cutters produce the diameter of the bearing, which will be ground to a finish in a subsequent operation, and the recess cutters produce the finished bearing width, that is, the opposing surfaces of the stop collar (also called the oil collar) for the connecting rod, and the recess which is used as a grinding outlet in the transitional region between the bearing neck and the stop collars mentioned above on the radially internal portion of the crank webs.

Figure 1:
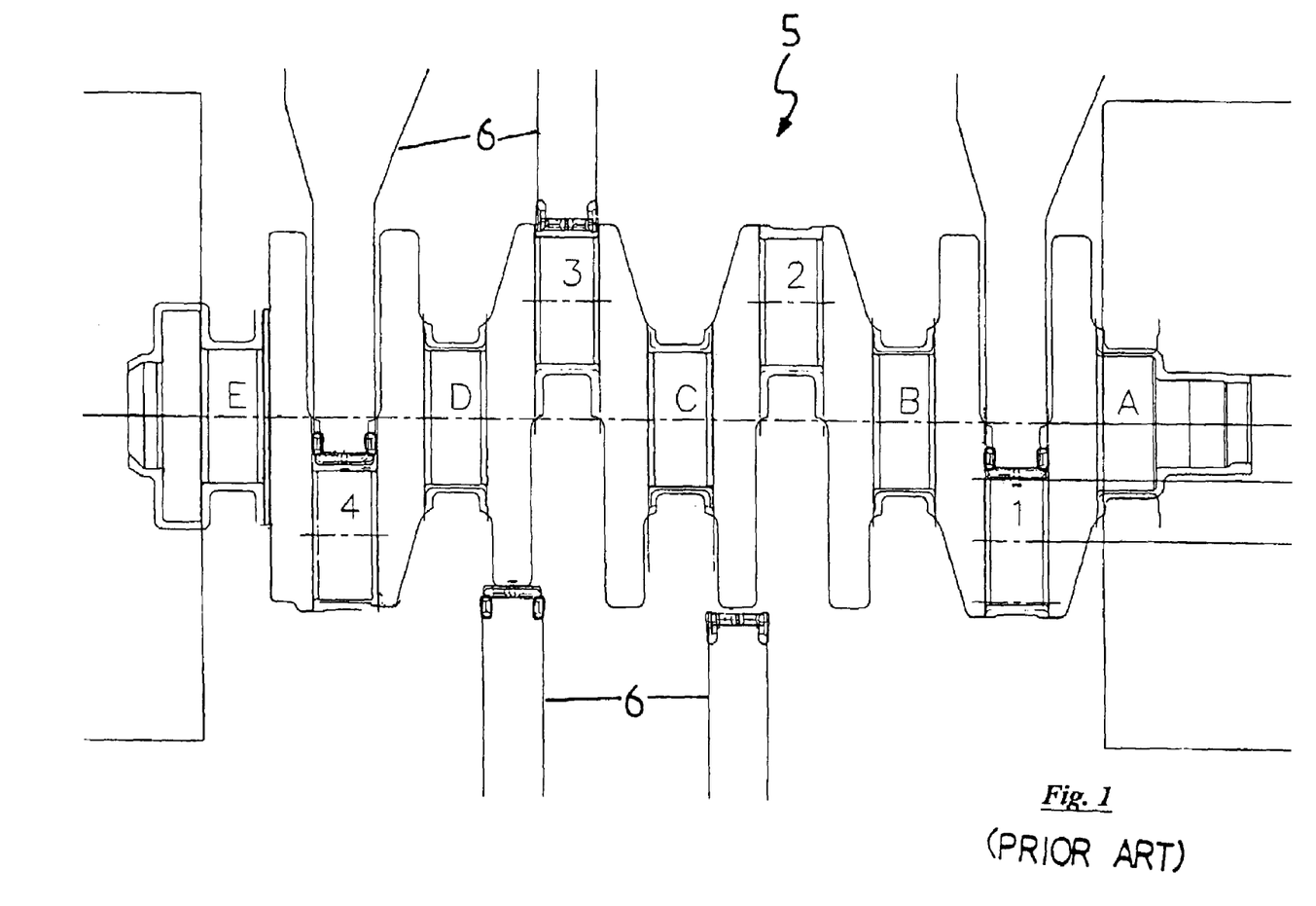
FIG. 1 shows the machining of a crankshaft according to the prior art.

By way of example, FIG. 1 shows a crankshaft 5 in the mounted condition. The crankshaft 5 has main bearings A, B, C, B and E and crank bearings 1, 2, 3, 4. The individual crank bearings are processed by means of the disc-milling cutter 6 using the pendulum process. In the context of the pendulum process, the crankshaft rotates around its axis of rotation during machining. The disc-milling cutters 6 rotating at the desired cutting speed follow the corresponding movement of the crank bearings 1, 2, 3,4. The processing of the crank bearings 1,2, 3,4 of the crankshaft 5 is essentially completed after each complete rotation of the crankshaft 5. The circumferential surfaces of the crank webs can also be processed in the same operation.

Figure 2:
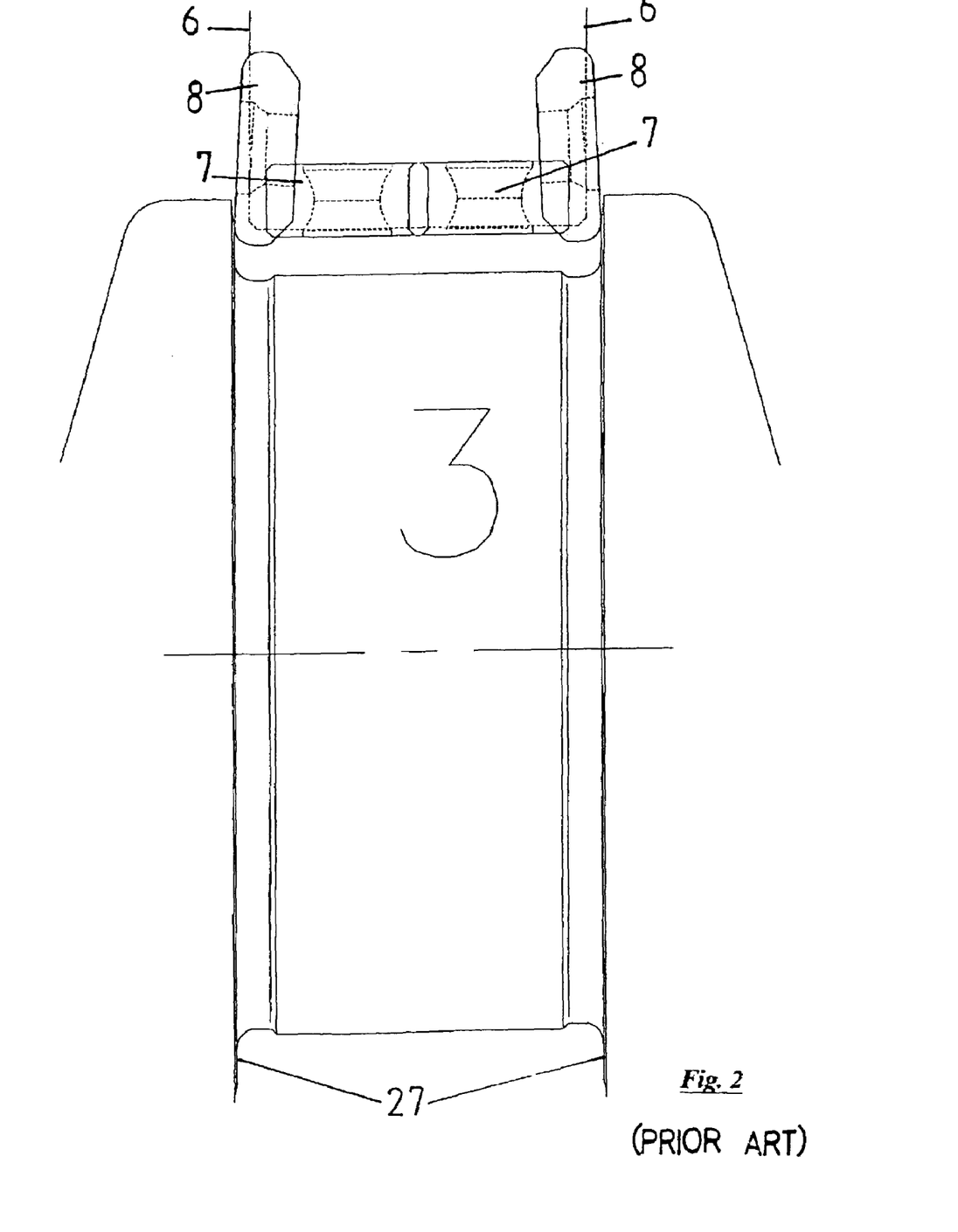
FIG. 2 shows an enlargement of a detail from FIG. 1.

FIG. 2 shows an enlargement of the machining of the crank bearing 3 from FIG. 1. In this case, the disc-milling cutter 6 is fitted with diameter cutters 7, arranged in a cross-toothed manner, and recess cutters 8. The diameter cutters 7 are arranged tangentially, while the recess cutters 8 are arranged laterally. The known laterally-arranged recess cutters are designed as an indexable insert with four cutting edges, which engage with the workpiece in dependence upon the direction of installation.

In particular when connecting rods are guided axially through a crankshaft, considerable demands are also placed on the surface of the stop collar and/or oil collar 27 of the crankshaft 5 in the meantime, so that these must be manufactured with particular care. Current disc-milling cutters have an optimum run-out tolerance of approximately 20 μm, so that the stop collars 27 can generally not be manufactured using milling processes alone, but also require subsequent grinding or precision turning.

WO 01/76796 proposes a cutter insert for camshaft milling cutters. In case of a camshaft milling cutter, the cutting edge of the cutter insert provides several cutting edge portions with an initial, straight portion, a second, straight portion adjoining the first portion and enclosing with it an angle between 90° and less than 180°, and a third cutting edge portion providing a convex curved course. The convex portion in this context forms the recess cutter. However, this camshaft milling cutter also has run-out tolerances in the order of magnitude of 20 μm.

The object of the present invention is therefore to provide a cutter insert and a milling cutter, which is suitable for the increasing demands of engine design and, in particular, which allows a significantly reduced run-out tolerance, so that the surfaces of the stop collars on crankshafts can also be processed in one milling operation without follow-on grinding. Moreover, the object of the present invention is to provide a cutter insert, which can be used in a cost-favorable manner for this purpose.

SUMMARY OF THE INVENTION

The object described above is achieved with a cutter insert for disc-milling cutters, in particular for milling crankshafts, with an upper and a lower surface and circumferential lateral surfaces connecting the upper and lower surfaces to one another, wherein the upper surface has raised swellings and/or projections at least in the region of two corners, which preferably extend over the entire length of one side of the cutter insert, so that in a plan view of a cutting face formed by at least one of the lateral surfaces, the edge, which defines the transition from the upper surface to the cutting face, has a portion projecting relative to the central edge portion in the region of each of the two ends of this edge. The edge profile of the cutting face therefore consists of a central portion, which will not be defined in greater detail here but which is generally straight, and two end portions with a bulging profile, which form the actual cutting edges.

In this context, the cutter insert is intended for an inclined installation, so that, depending on the direction of inclination, essentially only one raised and/or projecting end portion engages with the workpiece and serves as the cutting edge. As a result of this measure, two effective cutting edges, namely, a left and a right cutting edge, are provided on each of the lateral surfaces of the cutter insert acting as cutting faces. When the cutting edge engaging with the workpiece has been subjected to wear, the cutter insert can be used again in essentially the same orientation in another installation position, that is, on the opposite side of the disc-milling cutter relative to the previous installation position.

If the side of the cutter insert diametrically opposed to the side described is also used as a cutting face, that is, if, at its transition to the upper surface, one cutting edge is also provided at each of the projecting end portions, then the number of effective cutting edges is doubled to 4.

The profile of the raised and/or projecting portion can be designed to correspond to the desired profile of the recess acting as the grinding outlet in the transitional region between the bearing neck and the crank web of a crankshaft.

The raised portions therefore advantageously provide a convex curved course, wherein the curved portion may also consist of individual straight sections angled relative to one another, and wherein the convex curved portion extends over an angular range of more than 90°, preferably over an angular range of more than 95° and particularly preferably over an angular range of approximately 110° or more. The convex major cutting edge, formed in the region of a cutting corner essentially by the transition between one lateral surface and the raised swelling on the upper surface, extends to form a minor cutting edge, which is provided between the lateral surfaces adjacent to this cutting corner, one of which defines the cutting face and the other defines the minor flank.

The cutting face preferably extends at an obtuse transitional angle to the central portion of the edge between the upper surface and the lateral surface and/or cutting face, so that, provided it still engages with the workpiece, the portion of the cutting edge located towards the center runs inclined at an angle significantly less than 90° relative to the plane defined by the upper or lower surface. This keeps stresses and loading both on the cutter insert itself and on the transition of the actual bearing surface of the connecting-rod bearing to the grinding outlet to a minimum.

Particularly preferably, the cutter insert has a substantially cuboid structure and possesses four cutting edges in each case at the transition between two lateral surfaces and the upper surface and/or the bulging projections provided there, and preferably also has a substantially flat lower surface, which acts as a support surface and can be ground simply and accurately because of its flat geometry.

In view of the possibility of a tilted installation of the cutter insert, the edge which separates the cutting face and the upper surface, and the edge which separates the lateral edge opposite to the cutting face from the upper surface, each form two cutting edges, of which only one ever comes into contact with the workpiece. Accordingly, a total of four cutting edges, two on the right and two on the left, are provided, wherein, in each case, three of the cutting edges are automatically disposed within the cutting profile as a result of the corresponding installation position; they are therefore protected from accidental damage, e.g. through chip impact. The precise profile of the convex curved portion is adapted both to the desired profile of the recess and also to the desired angle of inclination of the cutter insert.

For example, the curved cutting edge portions may provide a straight portion at their sides facing the central edge portion, which, with the plane formed by the upper surface, encloses an angle of more than 90° and less than 180°, preferably more than 110° and less than 160°, particularly preferably more than 130° and less than 150°. As a result of this measure, the transition between the crank pin and the recess is formed in such a manner that the risk of damage is reduced.

In order to allow the best possible exploitation of the indexable insert, the cutting edges formed by the raised portions are advantageously designed in mirror-image symmetry to one another relative to a plane running perpendicular to the cutting face and perpendicular to the lower surface.

In one particularly preferred version, the outer limits of the raised portions form minor cutting edges. The interior surfaces of crank webs and/or stop collars can be machined with the assistance of the minor cutting edges.

With reference to a plan view of the cutting face, the minor cutting edges advantageously enclose an angle with the plane defined by the lower surface, which is greater than 95°, preferably greater than 98° and less than 110°, and particularly preferably approximately 100°.

Regarding the disc-milling cutter, the object mentioned at the outset is achieved with a disc-milling cutter with at least one seat for accommodating a cutter insert to be arranged tangentially on the disc-milling cutter, wherein the radial support surface of the seat is inclined relative to the axis of the disc-milling cutter or disc-milling segment. To achieve the necessary tool orthogonal clearance, the essentially radial surface of this seat is also slightly inclined in the circumferential direction, i.e., relative to the circumferential surface.

This measure ensures that a cutter insert can be arranged substantially tangentially in such a manner that only one of the cutting edges engages with the workpiece. The tangential arrangement ensures improved accessibility of the cutter insert when the cutter insert is being changed, because the fastening bores run radially (disregarding the slight tilting angle) and, accordingly, the fastening screws are accessible on the circumferential surface of the milling cutter. The tilted arrangement of the cutter insert, especially in the case of disc-milling cutters with diameter cutters and recess cutters, in which part of the cutting edge of the recess cutter does not engage with the workpiece anyway because of the presence of the diameter cutters, allows the use of recess cutters with several raised swellings as described above. The inclined installation position means that a raised portion forming a cutting edge disappears behind the contour of the diameter cutters so that this cutting edge does not engage with the workpiece.

The seat, or more accurately, the support surface of the seat, is preferably inclined predominantly in an axial direction, whereby, if possible, the axial angle of inclination of the seat is less than 15°, preferably between 4° and 10°, particularly preferably between 6° and 8°. In the circumferential direction, the support surface of the seat is inclined in accordance with the desired circumferential tool orthogonal clearance, that is, for example, by approximately 3° or somewhat more.

The inclined cutter-insert seat is advantageously arranged alternately on the right and left sides of the circumferential surface of the disc-milling cutter. If additional diameter cutters are mounted on the disc-milling cutter, an appropriate choice of length proportions allows the complete crank pin including both adjacent stop collars to be manufactured in a single operation using this cross-toothed arrangement.

In order to reduce the run-out tolerance, an adjustment device for the axial alignment of a cutter insert accommodated in the seat is advantageously allocated to at least one cutter-insert seat. This adjustment device allows the independent axial adjustment of the cutter insert, so that the run-out tolerance can be significantly reduced.

In one particularly preferred version, the adjustment device has a wedge, of which one wedge surface acts as an axial contact surface of the cutter-insert seat, whereby the wedge is arranged so that it can be displaced in a radial direction and adjusted in such a manner that its axial seat surface is also displaced in an axial direction at the same time as a radial displacement of the wedge, and indeed in a reducing ratio relative to the distance of the radial adjustment defined by the wedge angle and the working angle. By moving the wedge, a cutter insert accommodated in the seat is displaced within the seat in an axial direction. Of course, the wedge can be formed by any wedge-like or ramp-like surface.

The wedge has the advantage that the position of

It has been shown that the wedge advantageously has a working angle of less than 15°, preferably less than 10°, particularly preferably between 5° and 8°.

In a further, particularly preferred version, it is provided that the adjustment device for the wedge has a differential screw with two threads. Extremely accurate adjustments can be made with the assistance of a differential screw. The wedge has an internal thread corresponding to one of the threads of the screw. The other thread of the differential screw is screwed into a corresponding bore in the disc-milling segment adjacent to the cutter-insert seat.

The differential screw advantageously provides two threads, preferably two clockwise threads, with a pitch difference which is preferably less than 1 mm, particularly preferably, between 0.1 and 0.4 mm.

In addition to a radial stopping face formed by the support surface of the cutter-insert seat and the preferably adjustable, axial contact surface mentioned above, the cutter-insert seat expediently also has a tangential stopping face; a cutter insert mounted in the seat is pre-tensioned at least against the axial stopping face.

The mere fact that the cutter insert is pressed by its fastening screw by the pre-tension against an axial stopping face does not prevent the cutter insert from being additionally adjusted equally well in the axial direction by means of the adjustment device, because the manufacture of the cutter inserts and the cutter-insert seats in the disc-milling cutter and/or disc-milling segment is already relatively accurate, and the axial adjustment distance required to adjust the small run-out tolerances is only within the order of magnitude from 10 to 50 μm. As a result of elastic deformation, the attachment device for fixing the cutter insert in its seat still allows an appropriately limited movement of the cutter insert in an axial direction through the adjustment wedge. A fastening screw providing resilient properties which allow this limited movement is preferably used.

BRIEF DESCRIPTION OF THE DRAWINGS

Additional advantages, features and potential applications are explained with reference to the description of preferred versions and the associated drawings described below.

FIG. 3a shows a top perspective view of a cutter insert according to the invention.

FIG. 3b shows a top plan view of the cutter insert of FIG. 3a.

FIG. 3c shows a side elevational view of the cutter insert of FIG. 3a.

FIG. 3d shows a side elevational view of the cutter insert in a direction oriented perpendicularly to the direction in which FIG. 3c is taken.

DETAILED DESCRIPTION OF PREFERRED EMBODIMENTS OF THE INVENTION

FIGS. 1 and 2 show the method used hitherto by the applicant for processing crankshafts, which has already been described above.

FIGS. 3a to 3d show the cutter insert 14 according to the invention in various views. In the perspective view in FIG. 3a, the cuboid structure of the cutter insert can be seen clearly. The cutter insert 14 has a total of four cutting edges 10, 10', 10", 10'".

Figures 3A, 3B, 3C:
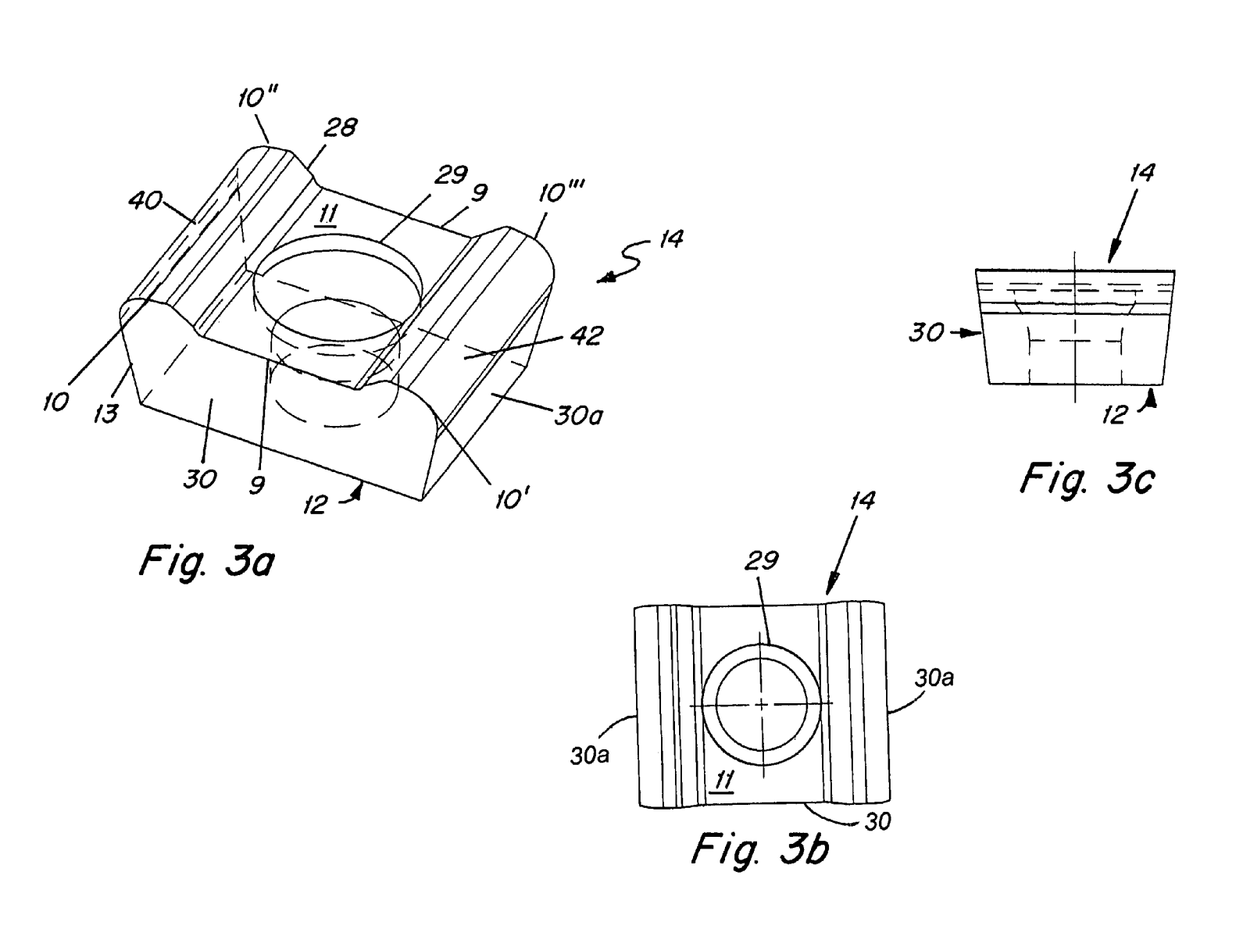

The cutter insert 14 includes top and bottom surfaces 11, 12 joined by peripheral side surfaces 30, 30a. The surfaces 30 constitute cutting faces. The surfaces 30, 30a intersect one another to form ninety degree corners as viewed in a direction toward the top surface 11 (i.e., as seen in FIG. 3b).

Figure 3D:
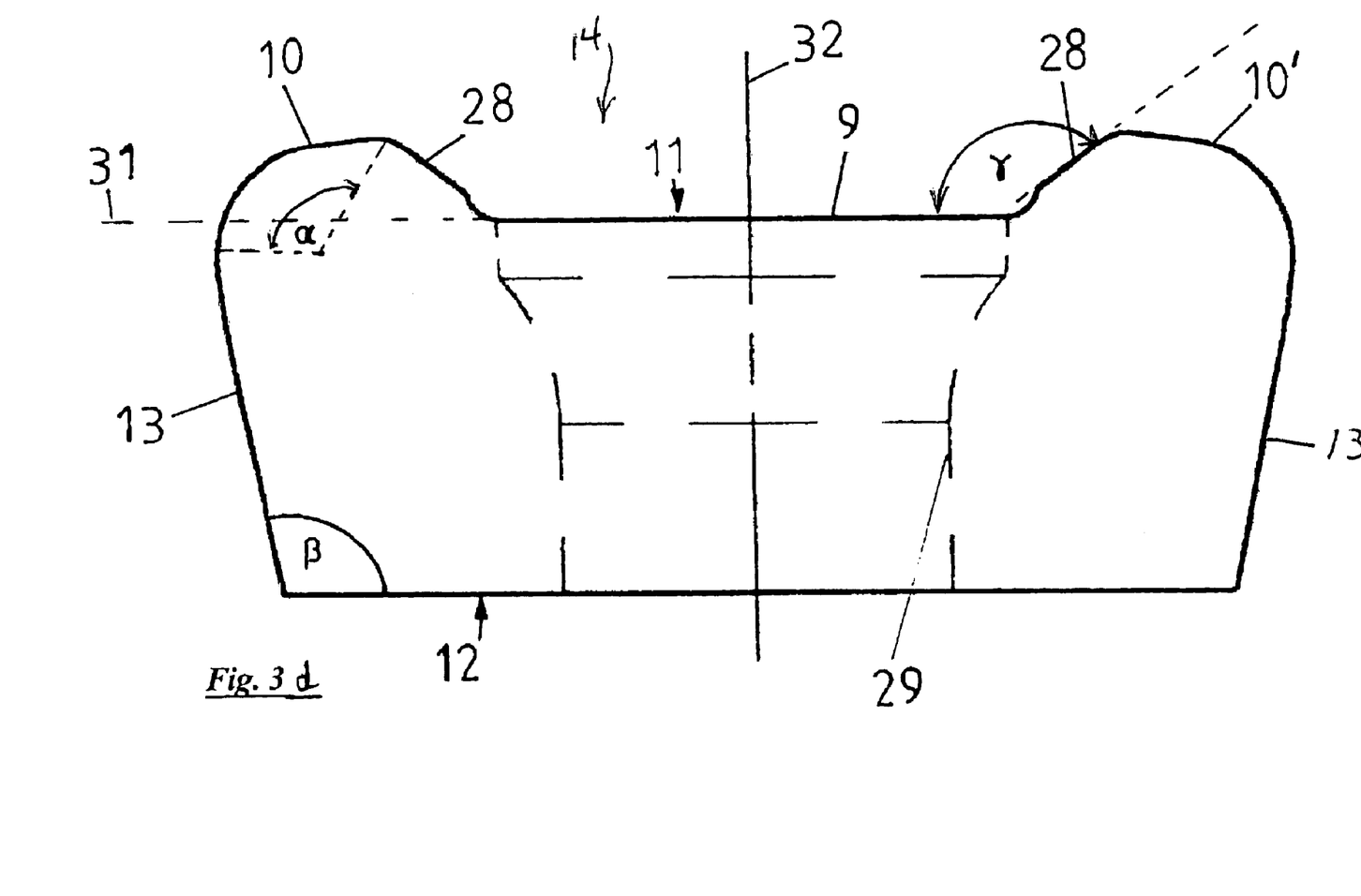

As shown particularly clearly in FIG. 3d, which represents a side elevational view of a cutting face 30 of the insert, the transition edge which separates the upper surface 11 from the cutting face 30 is composed of a central portion 9 and cutting edges 10, 10', which are raised relative to the central portion 9. The cutting edges 10 and 10" are disposed on a raised projection 40 of the upper surface 11 that extends along an upper portion of one of the side surfaces 30a. The two remaining cutting edges 10' and 10" are disposed on another raised projection 42 that extends along the opposite side surface 30a. The projections 40, 42 extend the entire length of the respective side surfaces.

Figure 3E:
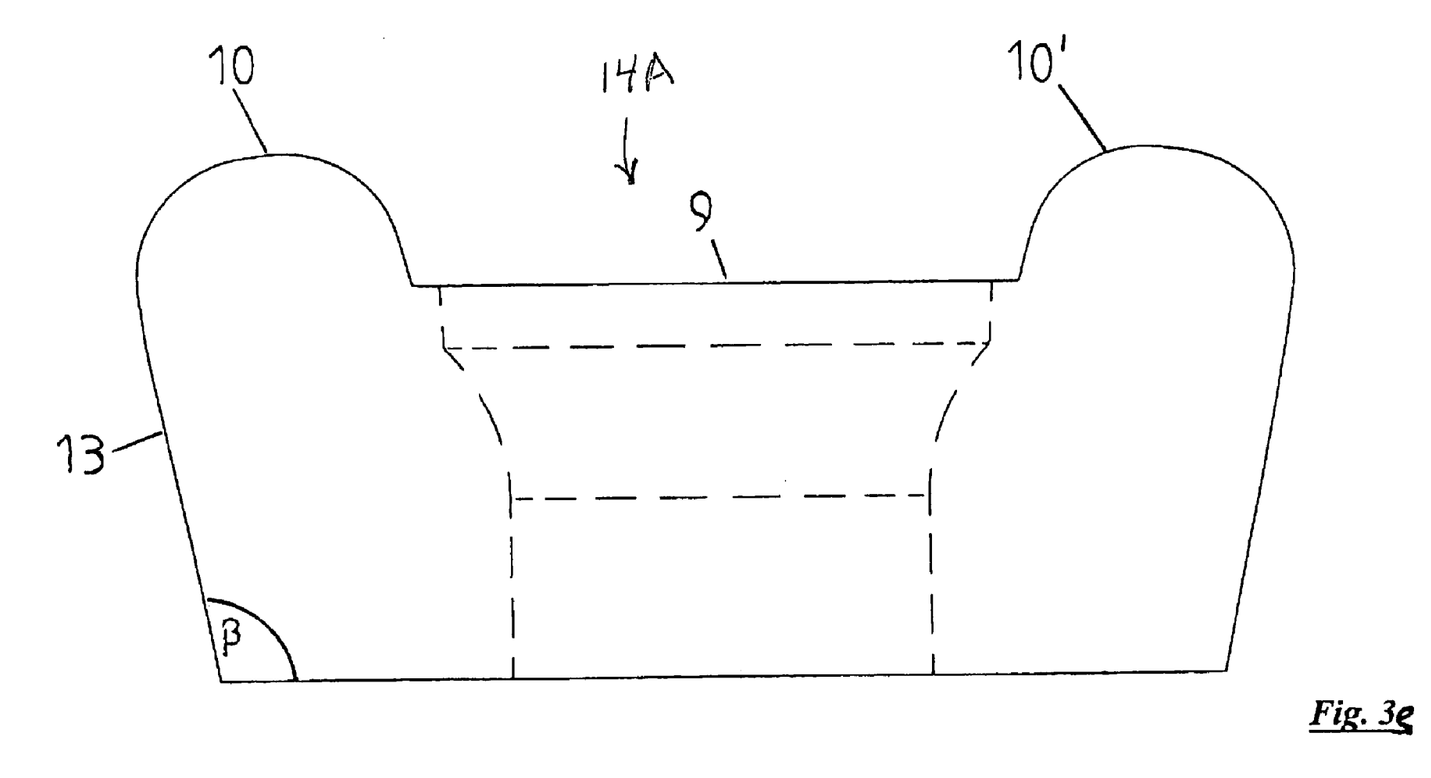
FIG. 3e shows a side elevational view of a modified version of a cutter insert according to the invention.

In the version shown, the central portion 9 is linear. Furthermore, a linear edge portion 28 adjoins each end of the straight central portion 9 and, together with the central portion 9, encloses an angle γ of approximately 140°. The raised portions 10,10' join respective one of these portions 28 and provide a substantially convexly curved course, whereby the curved region extends over an angular region α of approximately 110°. Each of the two curved regions 10 and 10' provides a transition into a minor cutting edge 13 which encloses an angle β of approximately 101° with the plane defined by the lower surface 12. Of course, the linear portions 28 adjoining the central portion 9 are not absolutely necessary. Accordingly, FIG. 3e shows another version of the cutter insert 14A, in which the convex curved portions extend over a considerably larger angular region a, the straight portions 28 having been omitted The precise design of the raised portions 10, 10', 28 is determined primarily by the desired profile of the recess to be cut.

A transition edge is defined between the upper surface 11 and each of the cutting faces 30. The transition edge thus includes a central portion 9 and two raised cutting edges, e.g. 10, 10' (or 10", 10'''), that are defined by respective projections 40, 42.

FIG. 3d clearly shows that the cutter insert 14 has two raised regions 10, 28 and/or 10', 28 at the two cutting corners visible in the diagram, which clearly project above the remaining center portion of the upper surface 11, as defined by a plane 31. The cutter insert provides mirror-image symmetry relative to a plane of symmetry 32 passing through the insert midway between the raised regions.

Approximately in the center of the upper and lower surfaces, the cutter insert 14 includes a fastening bore 29 for receiving a screw. The cutter insert 14 is intended to be attached to a disc-milling cutter in a tangential arrangement. In such a case, the surface 30 would constitute the cutting face, while the parts of the upper surface 11 formed by the raised swellings would represent the flanks.

FIG. 3c shows a side elevational view of the insert. In the case of the version shown, the cutting angles are designed to be positive in order to reduce the cutting forces, however, a negative design is, of course, also possible.

Figures 4A, 4B:
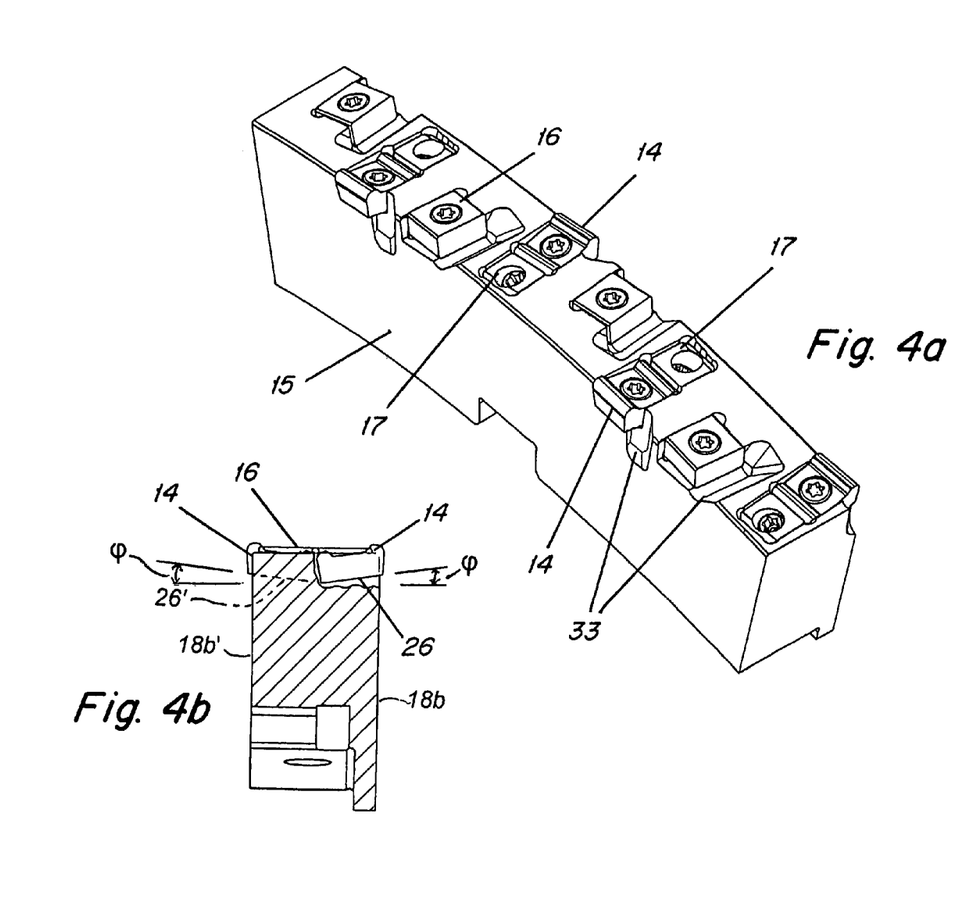
FIG. 4a shows a top perspective view of a disc-milling segment according to the invention with recess cutter inserts and diameter cutters according to the invention.
FIG. 4b shows a top perspective view of a disc-milling segment according to the invention with recess cutter inserts and diameter cutters according to the invention.
Figure 7:
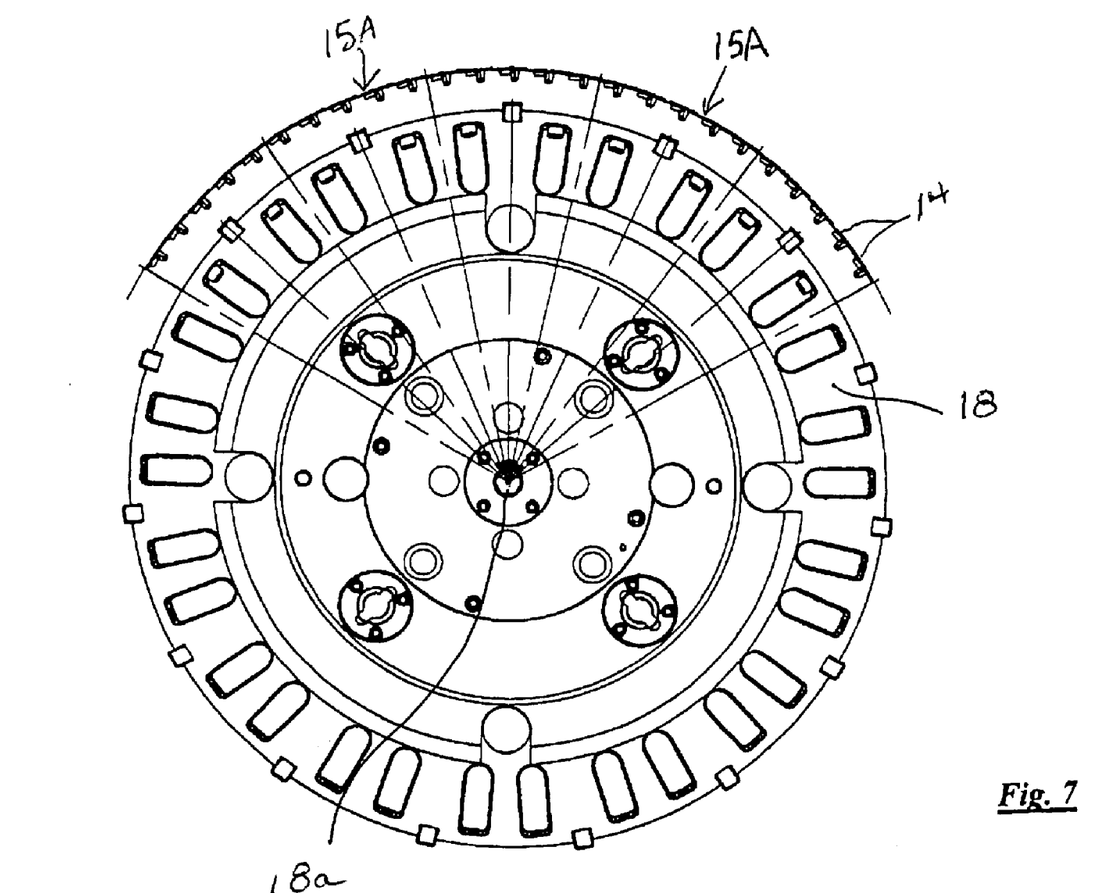

FIGS. 4a and 4b show the disc-milling segment 15 in a perspective view and in cross-section. The segment 15 is to be mounted on a circular outer surface of a milling disc 18, along with other segments 15 in circumferentially successive fashion. Thus, each segment 15 is somewhat curved about an axis coinciding with a center axis of rotation 18a of the disc 18 (see FIG. 7). Accordingly, reference made hereinafter to the axial and radial parameters is to be considered with reference to the axis 18a. On the disc-milling segment 15, cutter inserts 16 are provided as diameter cutters, and the cutter inserts 14 according to the invention are used as recess cutters. As can be seen in particular in FIG. 4b, the cutter inserts 14 according to the invention are arranged in an inclined manner so that in each case the insert's inner portion disappears behind the contour of the diameter cutters 16. In this version, therefore, only the external raised portions 10 or 10' of the cutter insert 14 according to the invention come into contact with the workpiece. Chip spaces are allocated to both recess cutters 14 and also to the diameter cutters 16; these are used for retaining chips and contribute to the improved removal of chips. Thus, in FIG. 46 there is shown a first support surface 26 and a second support surface 26' (in broken lines) that is spaced circumferentially from the first support surface 26. The first and second support surfaces extend from first and second end faces 18b, 18b', respectively, of the segment 15 at an axial angle ϕ relative to the axis of rotation.

Figures 5A, 5B:
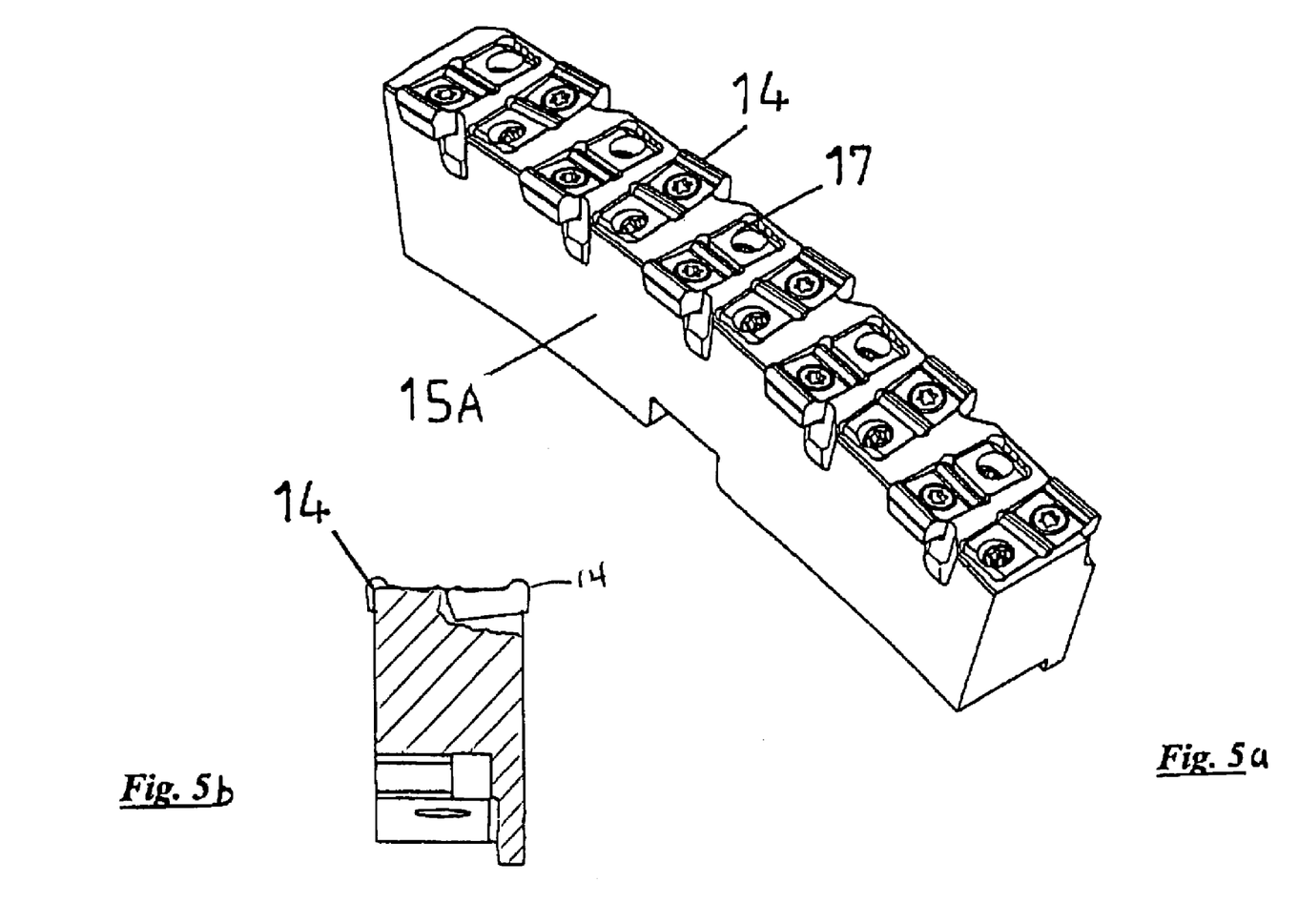
FIGS. 5a and 5b show two views of a second version of a disc-milling segment according to the invention with recess cutter inserts fitted.

FIGS. 5a and 5b show an alternative version of a disc-milling segment 15A. This disc-milling segment 15A has no diameter cutters 16, but only the cutter inserts 14 according to the invention, which are used as recess cutters and are arranged in a cross-toothed arrangement. This disc-milling cutter is only used after the diameter of the crank pin has already been milled using another disc-milling cutter. It is used only for processing the stop collars including the recess acting as a grinding outlet in the transitional region between the bearing neck and/or crank pin and crank web.

Figure 6:
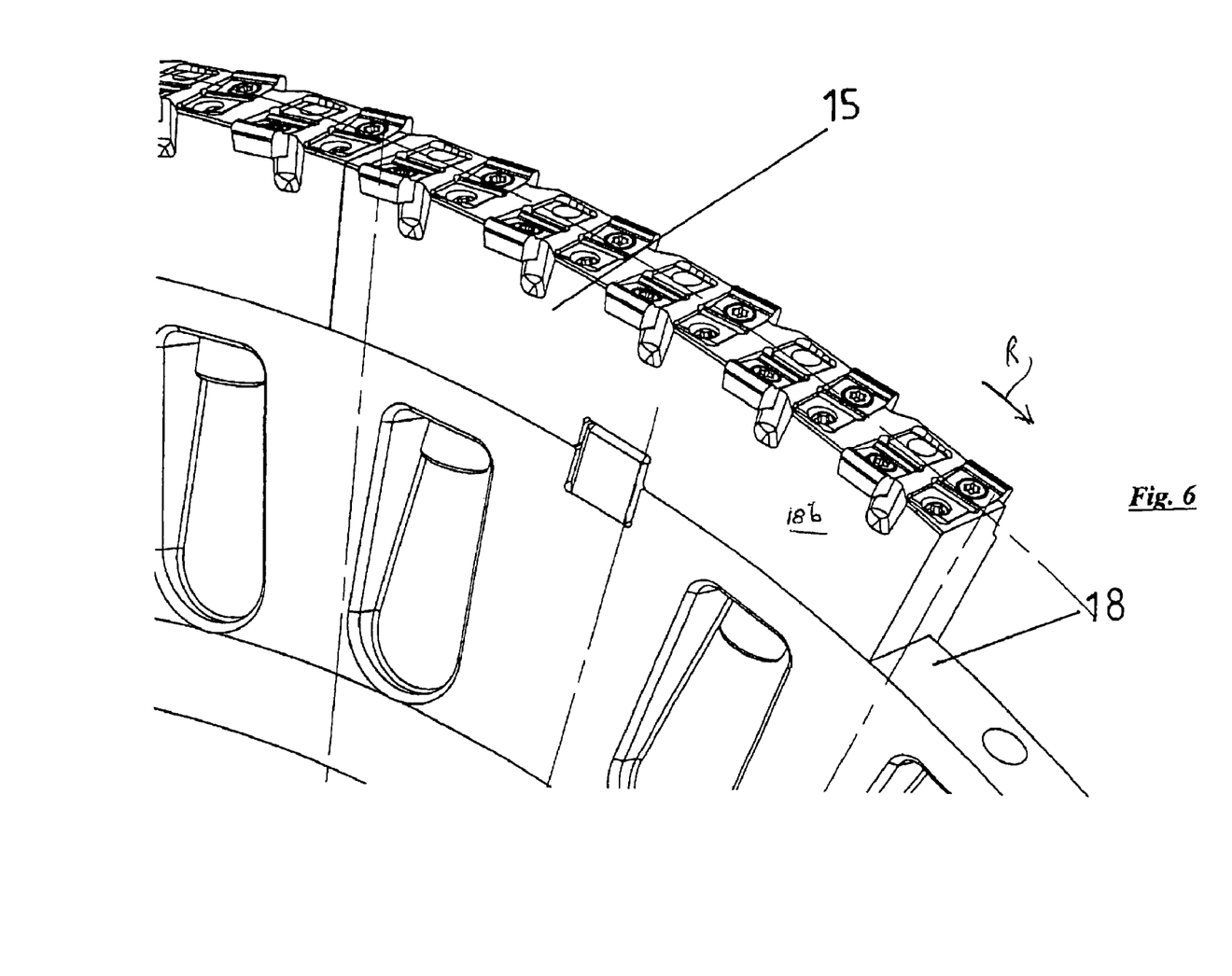
FIGS. 6 and 7 show views of the disc-milling cutter with fitted disc-milling segments.

As shown in FIG. 6, the disc-milling segments 15 are mounted on the milling disc 18. In the version shown, the milling cutter is fitted with fifteen milling segments, which carry a large number of cutter inserts (see FIG. 7).

Figure 8:
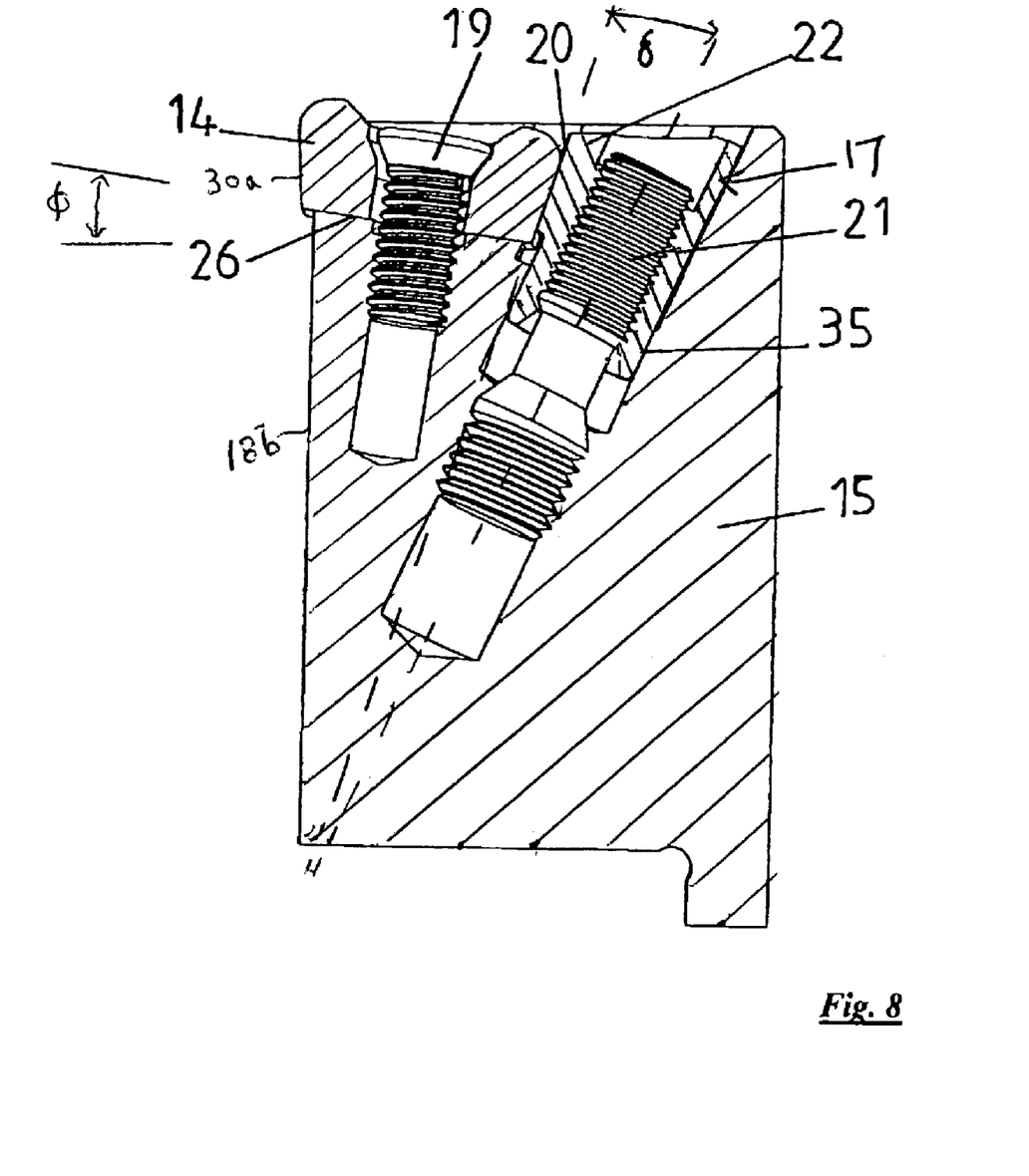
FIG. 8 shows a section through a cutter insert with wedge.

FIGS. 4a and 5a also show that an adjustment device 17 is allocated to each cutter insert 14 used as a recess cutter. FIG. 8 shows this adjustment device in an enlarged cross-section.

The cutter insert 14 according to the invention is fixed in the seat of the disc-milling segment 15 with the assistance of a fastening screw 19, which engages through the fastening bore of the cutter insert in a threaded bore a radially outwardly facing support surface 26 of the disc-milling segment 15. The surface 26 extends from an end face 18b of the segment and is inclined relative to the axis, e.g. by an acute axial angle ϕ of preferably about 7° (FIG. 8), to enable the inner portion (right-hand portion in FIG. 8) to disappear radially inwardly behind the diameter cutters 16, as noted earlier. Thus, an end of the support surface 26 (or 26') located remotely of the end face 18b (or 18b') is situated closer to the axis 18a than is an end of the surface 26 (or 26') situated at the end face. In addition the surface 26 is inclined at an acute angle relative to a tangent to the segment, wherein a leading end of the surface 26 in the direction of rotation R is located farther from the axis than is a trailing end of the surface 26, considered with reference to the direction of rotation R. The fastening bore, the screw 19 and the corresponding threaded bore in the milling segment are arranged in such a manner that the cutter insert is pre-tensioned during assembly against a stopping face 20 of the adjustment device. In this assembled condition, however, the cutter insert can still be moved at least to a limited extent in the axial direction (i.e., to the left in FIG. 8) by means of the adjustment device.

The stopping face 20 is disposed on a wedge which is a component of the adjustment device 17, the face 20 forming a generally axially facing face of the insert seat. The device 17 also includes a differential screw 21, which presses the wedge 22 and its stopping face 20 against the cutter insert 14. The working angle δ of the wedge 22 in the version shown, i.e., an angle formed between the stopping face 20 and the direction of movement D of the wedge, is less than 15°, preferably less than 10°, and most preferably in the range of 5–8°.

Figure 9A:
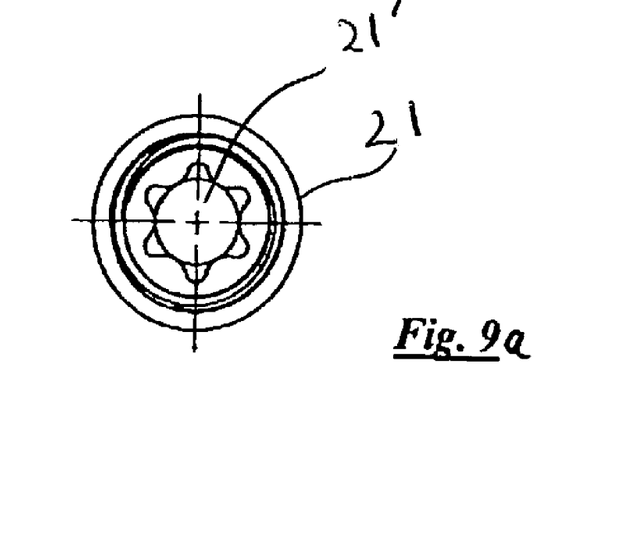
FIGS. 9a to 9f show various views of the differential screw and the adjustment wedge.
Figure 9B:
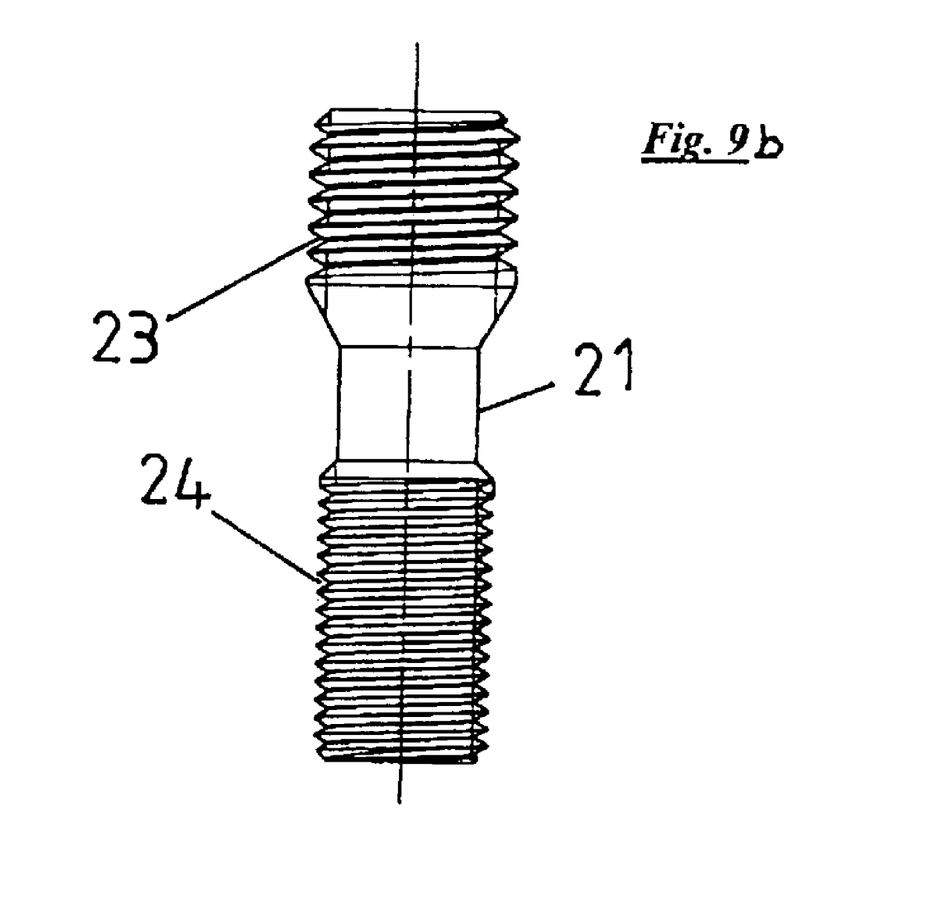
Figure 9C:
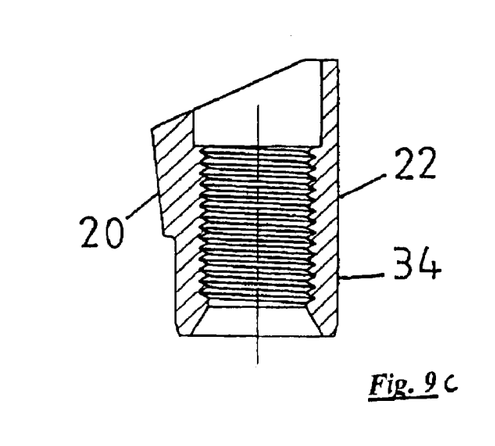
Figure 9D:
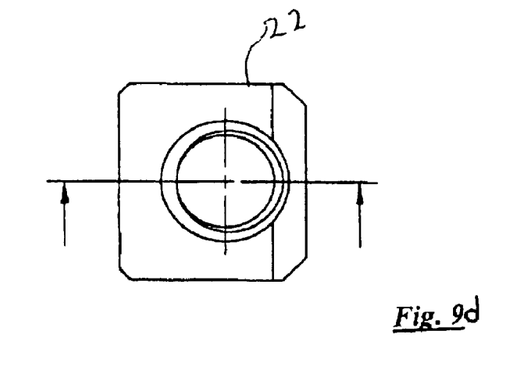
Figure 9E:
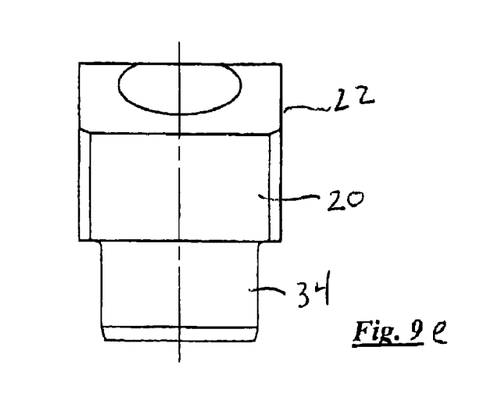
Figure 9F:
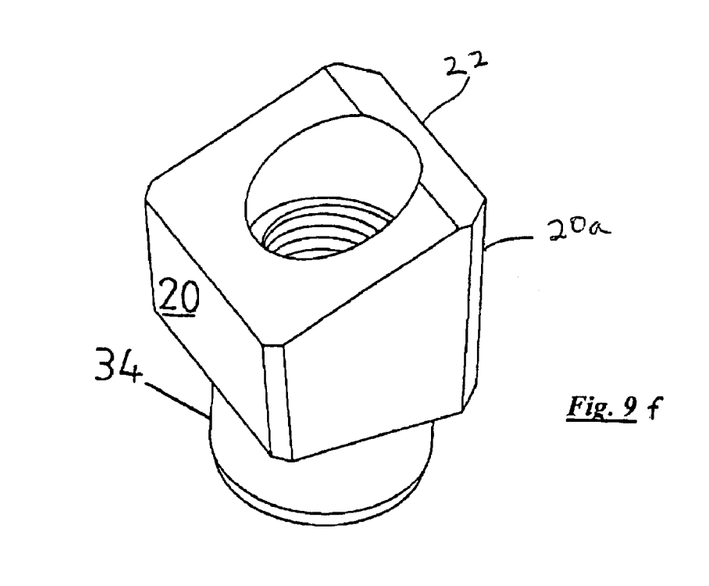

The precise structure of the adjustment device 17 is shown clearly in FIGS. 9a to 9f. FIGS. 9a and 9b represent two views of the differential screw 21. FIG. 9a shows a Torx® socket 21', with the assistance of which the differential screw 21 can be adjusted. However, any other socket, such as e.g. an internal hexagonal socket, can be used instead of the Torx® socket. The differential screw 21 has two clockwise threads 23 and 24. A further component of the adjustment device 17 is the wedge 22, having the corresponding inclined stopping face 20. The wedge 22 is shown in FIGS. 9c to 9f in various cross-sectional and perspective views. It consists substantially of a threaded sleeve with an external wedge surface 20.

At its lower end, the wedge 22 has a cylindrical connecting piece 34. This connecting piece engages, as shown clearly in FIG. 8, in a through-bore 35, which is provided coaxially above the threaded bore of the disc-milling segment. The cylindrical connecting piece 34 and the through-bore 35 are mutually matched in such a manner that the cylindrical connecting piece 34 is restrained within the through-bore 35. This restrained guidance ensures that, on its side facing away from the stopping face 20, a flank surface 20a of the wedge is supported on a guiding surface of the disc-milling segment. This simplifies the changing of the cutter insert because even in the released condition, the wedge always occupies an exactly defined position.

Figure 10:
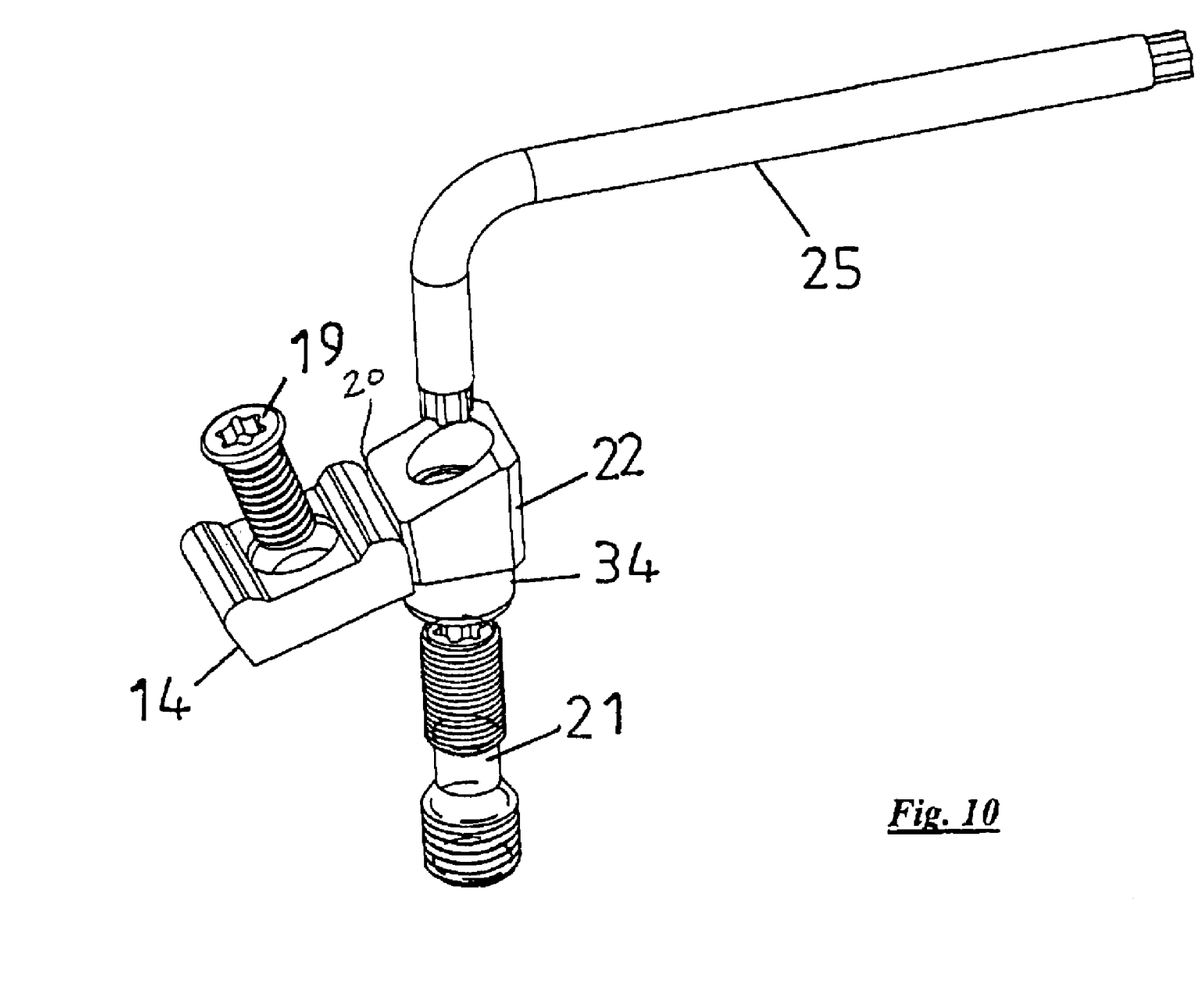
FIG. 10 shows the method of operation of the adjustment device according to the invention.

The method of operation of the adjustment device is shown in FIG. 10. Initially, the cutter insert 14 is fixed to the disc-milling segment 15 with the assistance of the fastening screw 19 in such a manner that the fastening screw 19 presses the cutter insert 14 against the stopping face 20 of the wedge 22, and the cutter insert can be moved at least to a limited extent in an axial direction (i.e., leftwards in FIG. 10). Now, with the assistance of the appropriate tool 25, which engages in the Torx® socket of the differential screw 21, the wedge 22 is pressed downwards, whereby the cutter insert 14 is pressed outwards. This limited mobility is achieved, for example, through the resilient properties of the fastening screw.

In the present case, the pitch difference between the two threads 23,24 of the differential screw 21 is 0.25 mm. This means that with a full rotation of the differential screw, the adjustment wedge 22 is displaced radially by 0.25 mm, and the indexable insert is displaced axially by 0.025 mm With a 14° rotation of the spanner, an axial adjustment of the indexable insert of 0.001 mm takes place. As a result, a precision adjustment is possible and the run-out tolerances are significantly reduced with the disc-milling cutter according to the invention. In the example shown, the run-out tolerance was set to less than 0.005 mm.

This precise axial positioning of the cutter inserts guarantees that all cutting edges participate in the surface structure and that extremely low waviness and surface roughness can be achieved on the workpiece.

It goes without saying that the adjustment device 17 according to the invention can also be used to advantage with other cutter inserts and other disc-milling cutters, which do not provide a raised portion or an inclined seat.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutter insert for a disc-milling cutter, comprising upper and lower surfaces joined by peripheral side surfaces, a first of the side surfaces defining a cutting face extending from a second side surface to a third side surface and forming two substantially ninety degree corners with respective ones of the second and third side surfaces as viewed in a direction toward the upper surface; the upper surface including a center portion and two raised projections; the projections being disposed at respective ones of the two corners, wherein a transition edge defined between the upper surface and the cutting face includes a central edge portion and two raised edge portions disposed at opposite ends of the transition edge and defined by respective ones of the projections, each of the raised edge portions defining a main cutting edge which transforms into a minor cutting edge defined by a respective one of the two corners, wherein the two minor cutting edges are convergent in a direction toward the bottom surface.

2. The cutter insert according to claim 1, wherein the raised edge portions are of convex shape as viewed in a direction toward the first side surface.

3. The cutter insert according to claim 2 wherein the raised edge portions are smoothly convexly curved as viewed in the direction toward the first side surface.

4. The cutter insert according to claim 3 further including linear edge portions joining each raised edge portion with the central edge portion as viewed in the direction toward the first side surface.

5. The cutter insert according to claim 2 wherein each convex raised edge portion extends for an angle greater than 90°.

6. The cutter insert according to claim 5 wherein the angle is greater than 95° and less than 120°.

7. The cutter insert according to claim 5 wherein the angle is about 110°.

8. The cutter insert according to claim 1 wherein the insert has a generally cuboid structure and comprises four main cutting edges.

9. The cutter insert according to claim 1 wherein the two raised projections are arranged symmetrically with respect to a center plane extending perpendicularly to the cutting face.

10. The cutter insert according to claim 1 wherein each minor cutting edge forms an angle with the lower surface which is greater than 95°.

11. The cutter insert according to claim 10 wherein the angle is greater than 98° and less than 110°.

12. The cutter insert according to claim 10 wherein the angle is 100°.

13. The cutter insert according to claim 1 wherein the projections extend higher than the central portion.

14. The cuter insert according to claim 1 further including a through-hole extending through the insert from the upper surface to the lower surface.

15. The cutter insert according to claim 1 wherein the lower surface defines a support surface, each of the minor cutting edges oriented at an obtuse angle with respect to a plane defined by the support surface, wherein the obtuse angles are open towards one another.

16. The cutter insert according to claim 15 wherein each of the obtuse angles is greater than 95°.

17. A cutter segment adapted to be mounted on a disc-milling cutter, the cutter segment including a body curved about an axis arranged to coincide with an axis of rotation of the disc, the body including a seat receiving a cutter insert, the seat including a radially outwardly facing insert support surface extending from an axially facing end face of the body, the support surface inclined at an acute axial angle relative to the axis, wherein an end of the support surface spaced remotely from the end face is located closer to the axis than is an end of the support surface situated at the end face, wherein the cutter insert comprises upper and lower surfaces joined by peripheral side surfaces, a first of the side surfaces defining a cutting face extending from a second side surface to a third side surface and forming two substantially ninety degree corners with respective ones of the second and third side surfaces as viewed in a direction toward the upper surface, the upper surface including a center position and two raised projections, the projections being disposed at respective ones of the two corners, wherein a transition edge defined between the upper surface and the cutting face includes a central edge portion and two raised edge portions disposed at opposite ends of the transition edge and defined by respective ones of the projections, each of the raised edge portions defining a main cutting edge which transforms into a minor cutting edge defined by a respective one of the two corners, wherein the two minor cutting edges are convergent in a direction toward the bottom surface.

18. The cutter segment according to claim 17 wherein said acute axial angle is less than 15°.

19. The cutter segment according to claim 18 wherein said acute axial angle is in the range of 4° to 10°.

20. The cutter segment according to claim 19 wherein said acute axial angle is in the range of 6° to 8°.

21. The cutter segment according to claim 17 wherein the support surface is inclined relative to a tangent to the segment, wherein a leading end of the support surface with reference to the direction of rotation is located farther from the axis than is a trailing end of the support surface.

22. The cutter segment according to claim 17 wherein the axially facing end face constitutes a first of two axially facing end faces of the body; the seat and the support surface constituting a first seat and a first support surface, respectively; the cutter segment further including a second seat having a radially outwardly facing second support surface spaced circumferentially from the first support surface and extending from a second of the end faces at an acute axial angle relative to the axis, wherein an end of the second support surface spaced remotely from the second end face is located closer to the axis than is an end of the second support surface situated at the second end face.

23. The cutter segment according to claim 17 further including an adjustment device mounted adjacent to the seat next to the support surface for adjusting a cutter insert along the support surface.

24. The cutter segment according to claim 23 wherein the adjustment device comprises a movable wedge.

25. The cutter segment according to claim 24 wherein the wedge includes a stopping face defining a surface of the seat, the stopping face oriented at an acute working angle of less than 15° from a direction of movement of the wedge.

26. The cutter segment according to claim 25 wherein the working angle is less than 10°.

27. The cutter segment according to claim 25 wherein the working angle is in the range of 5–8°.

28. The cutter segment according to claim 24 further including a differential screw for moving the wedge, the screw having first and second threads of different pitch; the pitch of the first thread being greater than the pitch of the second thread; the first thread engaging a threaded hole of the body; the second thread engaging a threaded hole of the wedge.

29. The cutter segment according to claim 28 wherein the pitch difference is less than 1 mm.

30. The cutter segment according to claim 28 wherein the pitch difference is in the range of 0.1–0.4 mm.

31. The cutter segment according to claim 17 wherein the seat includes a tangentially facing surface, a radially outwardly facing surface and a generally axially facing surface, the axially facing surface being movable to adjust the axial position of the cutter insert.

32. The cutter segment according to claim 31 wherein the generally axially facing surface is defined by a movable wedge, and the cutter insert is pre-tensioned against the generally axially facing surface.

33. The cutter segment according to claim 17 further including a fastener for clamping the insert in the seat, the fastener permitting limited adjustment of the cutting insert in a generally axial direction.

34. A cutter insert for a disc-milling cutter, comprising upper and lower surfaces joined by peripheral side surfaces, the side surfaces intersecting one another to form corners; the upper surface including a center portion and two raised projections; the projections extending along an upper portion of two opposite ones of the peripheral side surfaces, at least one of the side surfaces defining a cutting face forming a substantially ninety degree angle with each of two adjacent side surfaces as viewed in a direction toward the upper surface, wherein a transition edge defined between the upper surface and the cutting face includes a central edge portion and two raised edge portions, the raised edge portions disposed at opposite ends of the transition edge and defined by respective ones of the projections, each raised edge portion extending higher than the central edge portion; and a hole extending through the insert from the upper surface to the lower surface.

* * * * *